May 2, 1944.  W. L. KEENE  2,347,742
PICKLING PROCESS
Filed Sept. 18, 1939
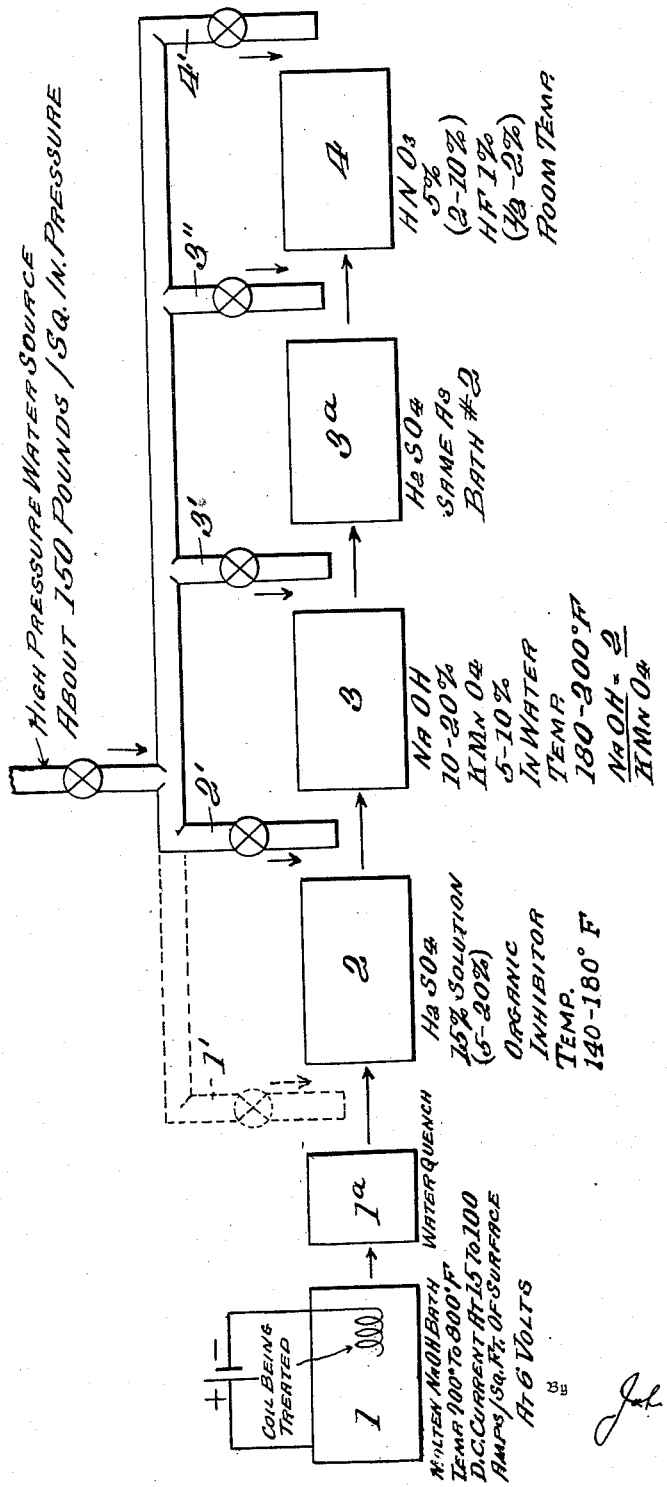
INVENTOR
Walter L. Keene
HIS ATTORNEY Patented May 2, 1944

2,347,742

UNITED STATES PATENT OFFICE 2,347,742

PICKLING PROCESS

Walter Lewis Keene, Baltimore, Md., assignor to Rustless Iron and Steel Corporation, Baltimore, Md., a corporation of Delaware Application September 18, 1939, Serial No. 295,520

7 Claims. (Cl. 204—145)

My invention relates to the removal of scale from ferrous alloy products and particularly concerns the removal of scale from various products of stainless steel. It is recognized that scale formation on chromium-containing alloy steel products is extremely adherent and difficult of removal, and my invention is directed to the rapid and thorough removal of such scale.

An object of my invention, therefore, is to devise a method of removing all types of scale from all qualities of stainless steel in the shortest possible time and with the least amount of skilled labor consistent with good practice, producing an excellent, clean, white, bright metal surface, in the best condition for inspection and subsequent operations, all in a thoroughly efficient and thoroughly reliable manner.

Another object is to devise such a method of removing scale from stainless steel at a minimum of investment in original equipment and maintenance costs, and at a minimum of manipulation of the composition of the baths or solutions involved. This method is characterized by its simplicity and low loss of metal resulting from its use, and ensures uniform attack on the scale and removal thereof, and guards against pitting or preferential attack on the metal itself and against acid-etching or pickle burning thereof.

Yet another object is to produce a series of successively employed baths for use in the removal of all scale from stainless irons and steels, which will cooperate in producing in rapid, reliable and efficient manner a clean, white, bright metal surface on the steels.

Other objects in part will be obvious and in part will be pointed out hereinafter.

The invention accordingly resides in the several steps of operation and the elements and units employed therein, and the relation of each of the same to one or more of the others, all as described herein, the scope of the application of which is indicated in the claims at the end of the specification.

The accompanying drawing contains a single view constituting a flow sheet. This flow sheet illustrates diagrammatically, in skeleton manner, the essential steps of my new method, and the essential units and parts cooperating in the practice of such method.

As conducive to a more thorough understanding of my invention, it may be pointed out at this time that the removal of scale formations on stainless steel products presents extreme difficulties. These scale coatings may result from a variety of heat treatments of the metal, as by hot-working, hot-working followed by annealing, and annealing or heat-treating steels which have previously been cleaned. It is essential that such scale be removed, among other reasons, because it is impracticable either to cold-draw or cold-roll a surface having scale thereon, or to apply thereon an adherent coating, such, for example, as a lead or copper coating. Furthermore, freedom from scale is found to improve the corrosion-resisting qualities of the stainless steels. When attempt is made to work steels covered with scale, as by cutting, machining, grinding, upsetting, forming, spinning, cold-working, drawing, etc., I find that the scale has a very injurious effect on the tools employed, producing undue burning, wear and conducing to short life of the tools. Finally, removal of the scale is requisite for inspection of the metal for surface defects, and to produce a metal surface of bright, pleasing appearance.

These scales are of various types and compositions, and have various degrees both of tenacity of adherence and thickness of deposit; all of which variables are dependent upon a number of different factors. To illustrate, the type of alloy, for example straight chrome or chrome-nickel steels, exerts a controlling influence; as does too, the temperature at which the scales are formed. Among other factors may be listed the condition of the atmosphere to which the alloys are exposed at the elevated temperatures, that is to say, whether the atmosphere is reducing, neutral or oxidizing.

Analysis shows that these scale coatings consist mainly of chromium and iron oxides, along with small amounts of other metallic oxides, sulfates and silicates. These chrome oxides in particular are quite stable, insoluble, and removable by acids only with extreme difficulty.

The scale coatings may vary in appearance from a light colored thin film to a heavy black scale, the color apparently in large measure being dependent upon the thickness of the coating. These coatings, complex in their composition and of variable characteristics, will hereinafter for convenience be referred to simply as scale.

In general, it may be stated that scale removal may be accomplished either by mechanical or chemical expedients. Usually chemical treatment is denoted as pickling, a term customarily connoting the use of acids.

In the treatment of common steels, it is ordinarily sufficient, in order to carry out the pickling operation in satisfactory manner, to employ but one acid, usually a hot dilute non-oxidizing acid such as sulfuric or hydrochloric acid. This acid attacks the various iron oxides, such as FeO, Fe₂O₃, Fe₃O₄, to form ferric and ferrous salts and water. Thus the acid may be said to have a dissolving action. Inasmuch as the iron oxides usually comprise by far the greater part of the scale, such acid pickling is generally sufficient for complete scale removal from ordinary ferrous metals.

Coupled with this dissolving action, there appears to be an outright mechanical lift resulting from the action of the free hydrogen. A possible explanation of this phenomenon is that the acid probably penetrates the minute interstices in the layer or layers of scale. Mechanically reacting against the metal underlying the scale coating, the free hydrogen serves to pry up the particles of the overlying layer of scale and to free them from their adherence to the metal. These particles are then in condition for ready removal.

While, as stated in the foregoing, pickling with sulfuric or other non-oxidizing mineral acid alone has been found to be effective in the case of common steels, I have found that such treatment is not satisfactory in treating stainless irons and steels. This unsatisfactory action of the sulfuric acid may be attributed in part to the presence in the scale of the highly insoluble chromium oxides, and also to the comparatively diminished action of free hydrogen. Additionally, the scale formed on stainless steels is usually both adherent and substantially continuous, presenting but few interstices in which the acid can penetrate and subsequently react to evolve free hydrogen.

Those working on the removal of scale from stainless steels appreciated that a more complex treatment than simple acid pickling was required. Accordingly, prior to my invention herein disclosed, the practice has been first to subject the steel to hot solution of acids such as hydrochloric, nitric or sulfuric, a step known as scale-rotting; and then to attempt to whiten and brighten the metal by subjecting it to nitric acid, either with or without hydrofluoric acid additions.

In treating a certain few types of scales encountered in stainless steel practice, this two-step pickling method has proved fairly satisfactory. In general, however, it may be stated that it possesses very serious disadvantages. For example, I find that it is much too easy to pickle-burn stainless steel by this two-step acid treatment. Additionally, in the absence of great care, the surface of the metal will usually be found to be roughened and pitted by the acid pickling. Metal loss is high, due to atttack by the acids on the metal surface itself, and the method is expensive.

I have found that acid pickling of stainless steels is additionally attended by the drawback that even where the scale is rotted, thereby placing it in condition for later removal, it is only by subsequent slow and tedious manual washing or scrubbing that it can be finally removed.

Because the double scale, which forms on the steel which is first hot-rolled and then annealed without intervening scale removal, is so highly insoluble and so tenacious and adherent, it has been necessary in many instances according to the practice prior to my invention to resort to what is known as double-pickling. By that term, I denote the removal of the hot-rolled scale before annealing, followed by removal of the annealing scale after removing the steel from the soaking pit.

Lastly, the heavy attack on the metal by the acid bath results in a high acid consumption as well as in a shorter life of the pickling solution with consequent necessity of frequently preparing new pickling solutions. The general effect of such procedures is to shorten tank life and to increase maintenance costs.

In short, the two acid method of pickling stainless steels does not satisfy the asserted requirements for good pickling practice which will be established hereinafter.

An important object of my invention therefore is to produce a method of removing scale from stainless steel products, which will avoid pickle-burning, pitting, or roughening of the metal; which will minimize the loss of metal; which will eliminate the necessity of double-pickling technique; which will enable the infiltration of the pickling ingredients into the scale layers so that any hydrogen which may be liberated is conditioned to act mechanically on the overlying layer of scale, all at a minimum of cost of pickling ingredients, and with the use of conventional and inexpensive tank equipment and with minimum investment in such equipment. A corollary object is to produce such a method in which the particles of scale, once they are loosened from the underlying metal, can readily be removed, simply by washing with water preferably under high pressure.

A further disadvantage of known acid treatments is that frequently it becomes necessary to adjust the composition, concentrations and operating temperatures of the acid baths in order best to remove a scale of particular composition. Furthermore, acid baths, where employed, must be constantly replenished to maintain them at proper concentration, and frequently dumped to avoid metal contamination. This requires the attendance at all times of a skilled operator, and necessitates frequent interruptions or shut-downs while the necessary adjustments are being made.

A further important feature of my invention is, therefore, to evolve both a method of removing scale from stainless steels, and a set of baths for use in carrying out such method; in the employment of which method and baths in connection therewith it is seldom required to adjust the compositions, concentrations and temperatures of the baths in accordance with the composition of the scale being subjected thereto; in which it is only infrequently necessary to replenish or dump the baths; and in which only moderately skilled labor is required; in which shut-downs rarely if ever are required; and by the use of which pickling departments in plant work may readily be maintained in clean and orderly manner; all with the production in rapid and efficient manner of a scale-free steel having a bright, clean metal surface.

In carrying my invention into practice, I preferably employ four baths, each containing a particular pickling solution. Between each adjacent pair of baths, with the possible exception of the first and second baths, a water wash is provided. For bath operation in cleaning coils and bars or other single pieces of work, I preferably provide a jet of high pressure water, having a pressure head of say 150 pounds per square inch.

In the first of these baths, designated as unit 1 on the drawing, I provide an electrolyte caustic tank containing molten caustic, such as sodium hydroxide, and designed for electrolytic treatment of coils, bars or other articles of stainless steel. Inasmuch as pure sodium hydroxide (NaOH) has a melting point of approximately 604° F., this caustic tank unit can be operated at almost any temperature, within reasonable limits, above that melting point. It should be observed, however, that if the temperature be maintained too low, the operation is slowed due to the caustic alkali freezing to the incoming metal, to which it clings until it remelts. Also, when the temperature of the bath is too low, drag-out losses, or losses due to the adherence of the alkali to the steel, are rendered abnormally high. I have found that the best and most economical temperature at which to operate the electrolytic unit is approximately from 700° to 800° F. This temperature is sufficiently above the melting point of the alkali salt to reduce delays resulting from freeze-ups. Furthermore, it is economical to maintain. Temperatures higher than 800° F. are uneconomical and lead to operating difficulties and, of course, extremely high temperatures become inoperative because of attack on the metal tank by the fused alkali if for no other reason.

In the operation of this bath, I apply a direct current thereto by way of electrodes of iron or nickel, the steel undergoing scale-removal serving as the other electrode. The fused caustic acts as the electrolyte. Ordinarily, a cathodic electrolytic treatment is employed using a direct current giving a current density of 15 to 100 amperes per square foot of work surface at a potential of say from 4 to 6 volts. It will be understood, however, that where desired there may be used an electrolytic treatment, consisting of two or more alternate cathodic and anodic steps, illustratively cathodic-anodic-cathodic, as more particularly described in the copending application of James N. Ostrofsky, Serial No. 182,631 filed December 30, 1937, now Patent No. 2,261,744 and entitled Metal cleansing.

Immediately adjoining the first unit and preferably forming part thereof, I provide a water quench tank. This tank is indicated at 1a on the drawing. Preferably it is serviced by the same handling equipment employed for tank 1.

This electrolytic caustic unit is particularly effective and efficient in the preliminary treatment of heavy scales. Such scales, for example, result from annealing following hot-rolling without intervening scale removal treatment. Such scales are especially heavy when no control has been exercised over the atmosphere maintaining in the annealing furnace, and when no mechanical scale-breaking operation has been employed. Such scales are not only heavy; they are also both adherent, and by consequence, extremely difficult to remove uniformly by the use of acids alone.

Where the material is first subjected to cathodic electrolytic action in fused sodium hydroxide for a suitable length of time, and is thereafter quenched in water, I find that in some manner the scale is converted into a condition where but short subsequent acid treatment is required to complete the greater part of the pickling treatment. A possible theory of such action is that sodium is formed by the electrolytic breakdown of the sodium hydroxide, whereupon the positive sodium ions migrate to the cathodic workpiece, where they react with and reduce the oxides. Additionally, it is probable that during the subsequent water quench, the film of active sodium enveloping the metal reacts with the water and, perhaps by mechanical turbulence, further advances the reduction. This conclusion is given validity by my observation that there invariably is considerable interaction, usually accompanied by sparking, when the metal is quenched in water.

I desire it to be distinctly understood, however, that I am not to be bound by the theory advanced immediately hereinbefore. This theory is offered solely as a possible explanation and not by way of limitation.

Following the electrolytic caustic alkali treatment, and subsequent water quench, the work piece is generally dark in appearance, but appears to be free in large measure from the greater part of the scale. It is probable, however, that most of the insoluble chromium oxides are still clinging thereon, as well as underlying acid-soluble scale ingredients, masked by the tenacious chromium compounds. When, for example, coils are subjected to caustic alkali pre-treatment, it is usually particularly difficult to obtain good electrical contact with every strand thereof, particularly at comparatively low current densities and voltages. Usually there are sections of the coil on which the scale has not been completely thinned out.

An important attribute of this bath is that prolonged exposure therein not only results in no harm to the metal, but actually may be beneficial, since no attack on the metal itself occurs in the fused alkali. Usually, action of the bath on the scale constituents is completed during the first ten minutes of the treatment, but no harm results from longer exposure. Under favorable conditions the action of the bath is substantially completed within a period of from one and one-half to two minutes.

A further important advantage of the bath is its permanency. I find it necessary, in an installation which I have been operating for some time, only to remove sludge from the bottom of the tank at infrequent intervals, and to add caustic occasionally to compensate for drag-out losses.

As a preliminary treatment, or pre-treatment, this electrolytic caustic bath is extremely valuable. I find that it serves to reduce materially the total pickling time and acid consumption in the subsequent stages of my process. In this connection, it should be noted that although the metal following the caustic treatment is in much improved condition, it is not yet suitable for either inspection or the usual subsequent operations, such as cold-drawing, without the scale-removing treatment in additional pickling units according to the practice of my invention.

Following the electrolytic caustic alkali bath, therefore, I provide a tank, indicated at 2 on the flow sheet, containing a non-oxidizing mineral acid, such as sulfuric acid. This bath comprises sulfuric acid at a concentration ranging say approximately from 5% to 20%. In the instant case, I prefer to form the bath of hot 15% sulfuric acid. The bath preferably is maintained at a temperature range of say, approximately 140° to 180° F. for best results. I prefer to include in this bath a small amount of organic inhibitor. If, however, for any reason some etching of the surface of the metal is desired, the inhibitor may be omitted.

I find that the action of the sulfuric acid bath in the pickling method according to my invention is to attack the iron oxides in the scale, thereby forming ferrous and ferric sulphates. I believe that simultaneously with such action hydrogen is liberated and this hydrogen furthers the scale removal by exerting a prizing action on the particles of scale. In its action on stainless steels it is probable that the sulfuric acid removes in solution a considerable quantity of iron oxides from the scale, although its action on the chromium oxides, such as $Cr_2O_3$, other than by some slight mechanical lever action of the hydrogen, is probably negligible.

Usually, metal coming from the electrolytic fused caustic bath and water quench are placed directly in this acid bath. This is also true of stainless steels coming directly from the controlled atmosphere annealing furnaces.

In the practical use of my invention, I have discovered that when the iron content of the sulfuric acid rises above a certain percentage determined by experience, then to ensure the most favorable results, it is necessary to dump the acid, clean out the tank, and make up a new solution. Additions of acid should be made daily, to keep the acid content at a desired value. Actual experience demonstrates that the bath should be dumped on an average of between once and twice a month.

The third unit of the series of baths according to my invention comprises a caustic-permanganate tank. I sometimes call this an alkali-permanganate bath. This tank, indicated at 3 on the accompanying flow sheet, contains a water solution of approximately 10% to 20% sodium hydroxide (NaOH) and 5% to 10% potassium permanganate ($KMnO_4$). The $NaOH$-$KMnO_4$ ratio is maintained at approximately 2 to 1. For best results I find it advisable to maintain the solution at a temperature ranging from approximately 180° to 200° F.

I intend this caustic-permanganate solution for use after the sulfuric acid pickling. Overlying iron oxides have been removed from the chrome compounds by the acid pickling. The insoluble chrome compounds are exposed, and are now ready for treatment. The principal action of the permanganate solution is to oxidize the insoluble chrome oxides to a more soluble form. In general, the sesquioxide $Cr_2O_3$ is insoluble, either in water or in sulfuric acid. On the other hand, chromic anhydride, $CrO_3$, is soluble. It is desirable, therefore, to oxidize the sesquioxide to the anhydride.

This is effected by the permanganate bath, the chromic anhydride dissolving as potassium chromate ($K_2CrO_4$), while manganese dioxide ($MnO_2$) precipitates out as a sludge.

This caustic permanganate bath is of considerable practical importance. It effectively dissolves the chromium oxides, or converts them into compounds which themselves are readily soluble.

I find this bath to be of especial value in the treatment of those stainless steels which are more easily attacked; that is to say, those steels which, while in the annealed condition, have an inherently lower resistance to corrosion. Prolonged soaking of such steels in the permanganate solution I find will greatly reduce the time required to proper acid pickling in subsequent treatment according to the practice of my new method.

In general, as in the case of the electrolytic caustic bath, I have discovered that prolonged exposure of the steel to the permanganate bath is beneficial, rather than harmful. There is no attack on the steel itself. I find that the general rule may be asserted that the longer the soak in the permanganate solution, the shorter is the time required in the two following acid baths, later to be described. In a typical instance, to illustrate, an overnight soak of the steels in the permanganate solution will condition the steels so that it is sufficient merely to dip them in the subsequent sulfuric acid treatment, and in the following nitric acid bath.

Just as in the case of the electrolytic caustic bath, I find that the permanganate bath is substantially permanent. It is only necessary to add sodium hydroxide and potassium permanganate at infrequent intervals to maintain the desired concentrations. These additions compensate for loss of both the constituents of the bath by drag-out with the steels, and for additional loss of permanganate solution due to chemical reaction. My observations lead to the conclusion that, say once a year or so, it is desirable to pump the permanganate solution into some convenient container, and clean the sludge out of the tank. The solution can then be pumped back into the tank whereupon the bath is again ready for use as soon as it is brought to proper temperature.

The steels, after subjection to the permanganate solution are removed from the bath, and preferably washed under a high pressure water stream. Inspection shows that the steel is free of the most of the chromium-containing constituents of the scale. Those chromium-containing compounds remaining are acid-soluble. The steels coming directly from the permanganate bath usually are dark in color.

Following treatment in the permanganate bath, I find it convenient, as suggested, to provide an additional sulfuric acid bath. This unit is illustrated at 3a on the flow sheet. I find it quite satisfactory for this bath to be similar to that of unit 2, that is, a 5%–20% sulfuric acid bath at an approximate temperature range of 140° to 180° F., and preferably containing an inhibitor. Where desired, I may use for this purpose the same bath as that of unit 2. Its purpose is to remove the remainder of the now soluble chromium derivatives of the scale, and to free the steel from any iron oxides underlying the previously insoluble chromium oxides. Upon removal of the steel from this acid bath, it may be washed with high pressure water, to remove adherent scale and acid. The steel at this stage of my process ordinarily has a dark gray surface which in a large measure is clean and free from scale.

As a final step in my new method, I desire to remove the last traces of scale from the steels, including silicates, sulfides and carbides, and other compounds of complex structure. For this purpose, I provide a bath, indicated at 4 on the flow sheet, comprising an aqueous solution containing approximately 2% to 10% nitric acid and about ½% to 2% hydrofluoric acid. In a typical instance this nitric-hydrofluoric acid bath contains 5% nitric acid and 1% hydrofluoric acid. I find that in most instances it is sufficient to maintain this bath at room temperature, although it is feasible to warm it slightly to accelerate its action.

This nitric-hydrofluoric acid bath I prefer to make up fresh, and to work it until its iron content builds up to say 1%, while the acid concentration has fallen to say about 1% to 2%. It is then preferable to dump the bath and refill. Experience shows, however, that best results on the well-known 18–8 chrome-nickel stainless steels (18% chromium, 8% nickel) are obtained if the total acid is 5% or higher and with low iron content. On the other hand, the straight chrome grades of steel usually can be cleaned thoroughly in a bath containing an acid concentration of as low as 2% or even less. Accordingly, good practice dictates the use of two baths. One of these should be kept fresh and strong, while the other is being worked out on the more easily cleaned grades. In a practical installation, however, where but one tub or bath is employed, and where the bath is worked 24 hours a day, I find it desirable to dump the bath on an average of every other day. In some instances, though, I find that the life of the solution may be as high as 100 to 150 hours, depending upon the type of steel being treated.

A thorough wash of the steels coming from this bath under high pressure water jets, usually reveals a thoroughly clean, white surface, ready for either marketing or subsequent operations.

Where it is found desirable to passivate these stainless steels before placing them in service, the hydrofluoric acid is omitted from the final bath, and the nitric acid bath usually is used while in a warm condition.

In the preliminary general discussion of my invention, I have mentioned the use of high pressure water jets. These jets have been discussed from time to time in narrating the details of the particular baths. Turning now to the flow sheet, it will be seen that I provide high pressure water jets, indicated at 2', 3', 3'' and 4' immediately following each tank employed in carrying out my method. The purpose of these jets is to wash off, with water at a pressure of say 150 pounds per square inch, all scale which may have been loosened, as well as all solution from the bath immediately preceding in order, to prevent such solutions from contaminating the next subsequent bath. The provision of such a jet of water, in conjunction with the electrolytic caustic bath and water quench 1, 1a is optional. Accordingly, jet 1' is indicated in broken lines in the flow sheet. While these high pressure washing jets are advantageous in the practice of my invention, they are not absolutely essential. I can omit one or more of them, with slightly less satisfactory results, and with somewhat greater contamination of the baths.

With the four units described in the foregoing, I am enabled to pickle thoroughly and quickly, with excellent resulting metal surface and with very low metal loss, any grade of stainless steel, having any type and condition of scale. I encounter good tank life, and find that fuming is not objectionable. Since using my new method, I have encountered no instances of pickle-burning or pitting of the metal. The steels are not over-etched, are easy to wash clean, and are in perfect condition for inspection and subsequent operations.

My new method involving the four units is by no means limited to pickling hot-rolled and cold-drawn annealed bars and coils, but is equally suitable for the pickling of castings, forgings, and other pieces of considerable size.

While in the foregoing I have described the provision of four principal baths, my experiments show that by no means do all scales require treatment by all four steps. To understand the best manner in which my invention is carried into practice, consideration of a certain few typical instances will be in order.

Consider first the case of hot-rolled annealed coils, of all grades of stainless steels. In this case, there is an underlying layer of hot-rolled scale, over which lies a layer of annealing scale. This annealing scale is usually formed during annealing at a high temperature. The scale is thick and hard.

To remove the scale from such coils, I first reduce the more readily removable oxides by subjecting the coils to immersion in the electrolytic caustic bath for about 5 to 10 minutes, at a current density of approximately 50 amperes per square foot of work surface, and at a pressure of six volts. I then water-quench these coils, which now are at the bath temperature of approximately 700 to 800° F. Thereafter, I remove most of the surface-lying acid-soluble oxides by subjecting these coils to soaking in the sulfuric acid bath for from 5 to 10 minutes, followed by washing with high pressure water. Chromium oxides are converted into soluble chromium compounds in the next step, which comprises a 20 minute soak in the caustic-permanganate bath. This treatment is attended by a subsequent high pressure water wash. Practically all remaining acid-soluble oxides and chromium-decomposition products or compounds are eliminated by a 5 to 10 minute soak in sulfuric acid bath 3a, followed by high pressure washing. Lastly, remaining scale is removed and a bright white surface obtained by soaking the coils for from 5 to 10 minutes in the cold nitric-hydrofluoric acid, and thereafter finally washing thoroughly with high-pressure water.

Following these treatments according to my method, the steel is perfectly clean and ready for all subsequent purposes, such as inspection, coating, and cold-working. In the event, the coils are not perfectly clean, then the last three steps should be repeated, but for shorter intervals of time.

I find that in the instance of coils or other materials which have been subjected to annealing treatments at lower temperatures than ordinarily used, or in which a prepared atmosphere has been employed, thus giving a light anneal scale, it is possible occasionally to omit the first sulfuric acid bath, as well as the caustic permanganate bath. In such a case the coils, previously subjected to cathodic electrolytic molten caustic treatment, are pickled in sulfuric and nitric acids alone. It will be found, however, that in pickling steels which have very tenacious scales, such as the 18–8 chromium-nickel steels containing molybdenum, it is advantageous to use the entire cycle outlined in my method, to obtain the most rapid cleaning and the best surface. The same is equally true concerning the processing of steels, such as the high carbon stainless types, having a lower resistance to corrosion when in the annealed condition.

The instances so far cited have concerned the treatment of coils, with their intricate surface configurations, and their comparatively minute surface interstices, which are difficult of access by the treating solutions. I will now discuss the application of my invention to the treatment of bars of stainless steel. By the term bars I intend to denote not only bars as ordinarily understood in the art, but also any other castings or forgings of considerable size and relatively simple surface configuration.

I will first discuss the pickling of hot-rolled, annealed bars, formed of all grades of stainless steels. In such case there is an underlying hot-rolled scale, topped by a layer of annealing scale. I find that it is quite sufficient, to remove the scale in thoroughly satisfactory manner, to subject the bars to the electrolytic molten caustic bath for from about 5 to 10 minutes, followed by quenching in water. The bars are then immersed for about the same length of time in the sulfuric acid bath, and are thereafter thoroughly washed. Finally, immersion for about 5 to 10 minutes in the nitric-hydrofluoric acid bath, followed by thorough washing in high pressure water, completes the process.

It is to be noted that in the treatment described immediately in the foregoing, one of the sulfuric acid baths, as well as the caustic-permanganate bath are omitted. A probable explanation of the facility of this simplified technique is that the good electrical contact which can be obtained with all portions of the surface of the bars by the caustic of the electrolytic bath renders possible the removal of the most tenacious chromium compounds.

As suggested in the foregoing, one of the most practical advantages of my new invention is the wide elasticity in the technique of practicing the same, in order to produce the best possible results in the treatment of any particular steel, at a minimum of cost, a minimum of labor, and with but little or no manipulation of the compositions, ingredients, or temperatures of the baths. To illustrate further, these novel advantages of elasticity, it may be noted that some of the grades of stainless steel which possess very resistant scales, such for example as 18–8 chromium-nickel steels containing molybdenum, will be benefited by a somewhat longer treatment in the sulfuric acid bath, than has been specified without, however, any damage resulting to the surface of the metal. The more easily attacked materials, including for example steels having an inherently lower corrosion resistance when in the annealed condition, will be improved with regard to their corrosion-resisting qualities by prolonging the duration of the soak in the permanganate solution. This prolonged soaking I find gives rise to the additional advantage of minimizing the required duration of the subsequent acid soak. By consequence, rolling defects are not masked by over-attack by the several solutions, so that defective pieces are more readily detected at an early stage in their processing.

In short, I find that by the practice of my invention, employing the several solutions and the procedural steps set forth hereinbefore, I can carry out in thorough manner the rapid pickling of all types of stainless steels. The several baths available according to my invention, to be used in the removal of a particular scale, and the duration of time of immersion in the baths employed, can be selected and determined in ready manner with highly efficient results. A clean, unattacked surface results. With the exercise of reasonable care, acid-etching or pickle-burning of the metal is avoided, and in reality, pickle-burning may be said to be entirely eliminated. So far as concerns acid-etching and pickle-burning, the solutions according to my invention may be said to be practically fool-proof. While experienced operators are always desirable, my invention for the first time makes their employment not absolutely essential for good results. As has been suggested hereinbefore, the old practice of double-pickling, or removing hot-rolled scale before annealing, is no longer necessary. Neither is it necessary, especially where the electrolytic caustic bath is first employed, to scale-crack the lower chromium stainless steels. Thus, far more latitude in annealing practice and atmospheres, than is usually permissible, is made possible by my process.

Because I adjust the several baths so that attack on the underlying metal is at a minimum, the pickling loss of metal is at a very low figure in the case of all grades of stainless steels. I find this pickling loss, for example, to be in the neighborhood of say only ½%, or even less. And this is true even of the low chromium steels having lesser resistance to corrosion attack.

I find that as contrasted to prior, existing techniques, the practice of my invention is attended by appreciable decrease in pickling costs, by improved surface on the steels undergoing treatment, and by the maintenance of a much cleaner and more productive pickling department. The pickling department in a plant now employing my new invention, far from constituting a place to be avoided, as where hitherto known techniques were employed, is somewhat of a show place.

My new technique has minimized manipulation of the levels, concentrations, compositions, and temperatures of the several solutions employed. Tank life has been rendered indefinitely long in the case of the caustic baths, and highly satisfactory in the instances of the acid baths. Additionally, fuming has been greatly curtailed, so that ordinary ventilation has been satisfactory.

Additionally, my new invention is highly meritorious as contrasted with prior known techniques, in that scale is so loosened or deteriorated in the several baths that little if any difficulty is encountered in removing scale and producing a clean surface, simply by washing in high pressure water. Thus, it is no longer necessary to have recourse to slow, laborious and costly hand-rubbing or wiping.

While in the illustrative embodiments of my invention, described herein, a bath operation is particularly indicated, it will be understood that the process of my invention is applicable to the continuous cleaning and descaling of sheet, strip, wire and other converted forms of stainless steel. Also it is understood that many minor changes may be made in the practice of my invention in matters of quality, concentration and temperature of the baths employed, and in the construction of the tanks used, as by including mechanical agitators. Since, therefore, many possible embodiments may be made of my invention, and since many changes may be made in the embodiments hereinbefore set forth, it will be understood that all matter described herein or shown in the accompanying flow sheet is to be interpreted as illustrative, and not in a limiting sense.

I claim:

1. In the removal of a light scale from stainless steel products, the art which comprises the steps of removing the greater part of the oxide content of the outerlying scale by subjecting the scale-covered metal to cathodic treatment in a bath of fused sodium hydroxide at a temperature of about 700° to 800° F. followed by quenching the metal in water, and thereafter forming soluble compounds of the remaining scale by subjecting the metal to non-electrolytic treatment in a dilute sulfuric acid bath containing an organic inhibitor and maintained at a temperature of at least 140° F.

2. In the removal of a light scale from stainless steel products, the art which comprises the steps of subjecting said products to cathodic treatment in a molten sodium hydroxide bath at a temperature of about 700° to 800° F., then quenching the products in water; thereafter subjecting the products to non-electrolytic treatment in a dilute inhibited sulfuric acid bath at a temperature of 140° to 180° F.; and then dipping said products in a cold nitric-hydrofluoric acid bath.

3. In the removal of scale from stainless steel products, the art which comprises, subjecting the scale-covered metal to cathodic treatment in a molten caustic bath at a temperature of 700° to 800° F., then quenching the metal in water, thereafter subjecting the metal to non-electrolytic treatment in a hot dilute non-oxidizing mineral pickling acid bath, then subjecting the metal to a bath of permanganate and alkali, then subjecting the metal to a hot dilute non-oxidizing mineral pickling acid bath.

4. A method according to claim 3 in which the metal is washed with high pressure water following removal from the several baths, to remove decomposed scale and any ingredient of the baths carried by the metal.

5. In the removal of scale from stainless steel products the art which comprises, subjecting the scale-covered metal to cathodic treatment in an electrolytic bath of fused sodium hydroxide at a temperature of 700° to 800° F., thereafter subjecting the metal to non-electrolytic treatment in a hot dilute sulfuric acid bath, then subjecting the metal to a hot aqueous sodium hydroxide-potassium permanganate solution, then subjecting the metal to a hot dilute sulfuric acid bath, and thereafter subjecting the metal to a cold, nitric-hydrofluoric acid bath.

6. The art of removing hot-roll scale and anneal scale from stainless steel products which comprises the steps of, first subjecting the scale-covered metal to cathodic treatment in a bath of molten concentrated caustic soda at a temperature of about 700° to 800° F.; thereafter subjecting the metal to water; then subjecting the metal to non-electrolytic treatment in a dilute solution of non-oxidizing mineral pickling acid; then subjecting the metal to a 10% to 20% sodium hydroxide, 5% to 10% potassium permanganate solution, the ratio of sodium hydroxide to potassium permanganate being substantially 2 to 1; next immersing the metal in a dilute solution of non-oxidizing mineral pickling acid; and thereafter subjecting the metal to a cold, nitric-hydrofluoric acid bath.

7. The art of removing hot-roll scale and anneal scale from stainless steel wire coils, which comprises the steps of first reducing the scale by subjecting the scale-covered metal to cathodic treatment in a bath of concentrated caustic soda at 700° to 800° F.; quenching the metal in water; thereafter subjecting the metal to non-electrolytic treatment in a dilute sulfuric acid bath maintained at between 140° to 180° F. to remove the greater part of the oxide content of the remaining scale; then subjecting the metal to a 10% to 20% sodium hydroxide, 5% to 10% potassium permanganate solution at between 180° to 200° F., to remove the remaining tenacious or underlying oxide constituents of the scale by converting the insoluble chromium oxides to soluble chromium compounds; next immersing the metal in a dilute sulfuric acid bath maintained at between 140° to 180° F., to remove substantially all the said remaining oxides or their conversion products; and thereafter removing all remaining scale and producing a bright white surface on the metal by subjecting the metal to a nitric-hydrofluoric acid bath maintained at room temperature.

WALTER LEWIS KEENE.